Patented Sept. 9, 1924.

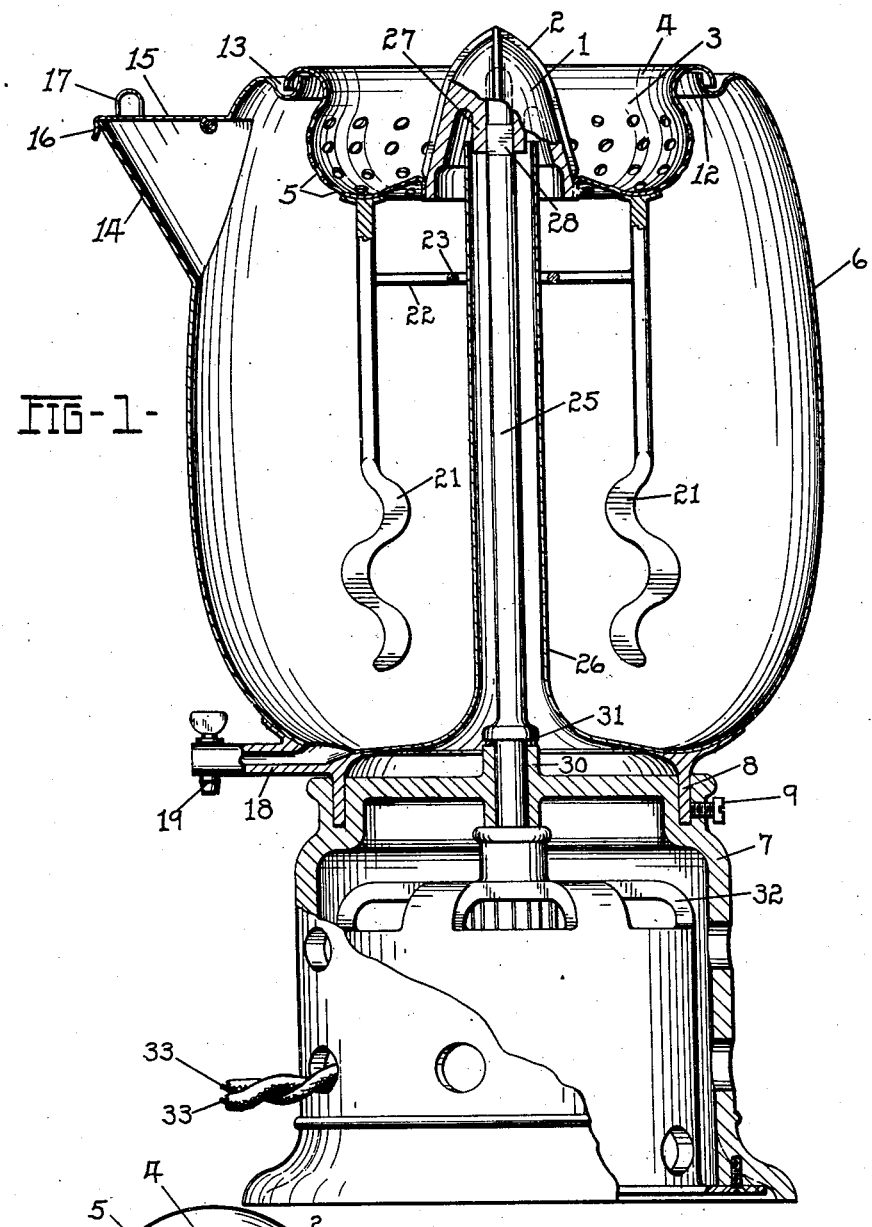
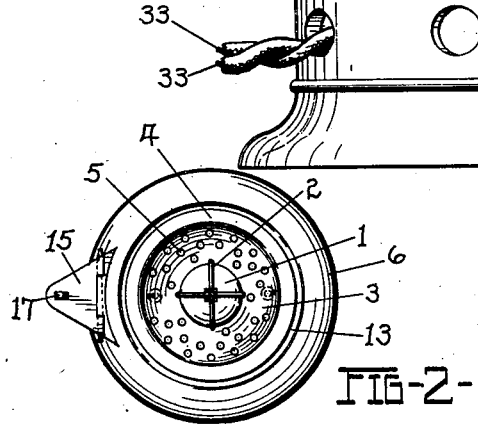

1,507,880

UNITED STATES PATENT OFFICE.

ANDREW ZOUVELOS, OF TOLEDO, OHIO.

FRUIT-JUICE EXTRACTOR AND MIXER.

Application filed July 3, 1924. Serial No. 724,020.

*To all whom it may concern:*

Be it known that I, ANDREW ZOUVELOS, a citizen of the United States, and a resident of Toledo, in the county of Lucas and State of Ohio, have invented a new and useful Fruit-Juice Extractor and Mixer, which invention is fully described in the following specification.

My invention has for its object to provide an efficient fruit juice extractor combined with a means for thoroughly mixing the fruit juice or fruit juices with other liquids. The invention provides a means for removing the juice and immediately directing it into a receptacle wherein the liquids to be mixed are rotated at a high speed by a means directly connected to the fruit juice extractor. The invention also has for its object other features and advantages which appear in the following description and upon examination of the drawings.

The invention may be contained in structures of different forms that are within the purview of the novelty of my invention. To illustrate a practical application of the invention I have selected a structure as an example of structures embodying my invention and shall describe it hereinafter. The structure selected is shown in the accompanying drawings.

Figure 1 is a view of a vertical section of a fruit juice extractor and mixer containing my invention. Figure 2 is a top view of the extractor very much reduced in size.

The structure shown in the drawing is provided with a head 1 substantially ovoid in form and formed of any suitable material such as glass or metal, that will not be affected by the acids of the fruit. The head is provided with ridges 2 that will engage the cells of the fruit, and on rotation of the fruit relative to the head or rotation of the head relative to the fruit will press the juice contained in the cells therefrom. The head 1 is connected to a bowl shaped receptacle 3. If desired, the receptacle 3 and the head 1 may be formed integral and may be formed of glass or of metal which is chemically resistant to any action that might be caused by fruit acids. The diameter of the body portion of the bowl shaped receptacle exceeds the smaller diameter of the lip 4 of the receptacle, the lip and the body portion of the bowl conforming to a surface generated by the revolution of an ogee line about the axis of the head 1 and located in the same plane as the axis, whereby rotation of the receptacle 3 will cause the juices to centrifugally move to the lateral surface of the receptacle, and yet by reason of the smaller diameter of the mouth of the bowl the liquids will not be centrifugally carried over the upper edge of the receptacle. The receptacle is provided with holes 5 that are located in the portion having the larger diameter through which the liquids will be caused to rapidly escape by reason of the centrifugal action induced in the liquid by rotation of the receptacle.

The liquids are received by the container 6 that is supported on a shell 7. The container 6 may be provided with a flange 8 that sockets into a channel formed in the upper end of the shell 7. The container 6 may be held, if desired, in position by means of the screw 9. The container 6 may be formed of glass or other suitable material that is immune to the action of fruit or weak acids, and furthermore it may be made in any shape desired. It is preferably provided with an inwardly extending lip 12 that is overhung by the lip 4 of the receptacle 3. Preferably the lip 2 is curved upwards to form a circular channel 13 into which the lip 4 extends. This provides a means for closing the interior of the container 6 and prevents the liquids contained in the container 6 from escaping while they are being mixed.

In order to conveniently introduce liquids into the container 6, the container may be provided with a mouth preferably semi-funnel shaped, formed by a protruding portion 14 of the side wall of the container 6. This part of the container 6 may be provided with a cover 15 that is hingedly connected to the container 6. If desired, a latch 16 or a protruding elastic tongue may be formed from the metal of which the cover 15 is formed and which will engage the edge of the protruding portion 14 to yieldingly maintain the cover 15 in a closed position. The cover 15 may also be provided with a handle 17 whereby the cover 15 may be conveniently opened. If desired, the mouth 14 may be used for removing liquid contained in the container 6 but the liquid is preferably drawn from the container through the pipe or spigot 18 that may be closed by a suitable valve or cock 19 when the liquids contained in the container have been mixed to the desired degree. In order to cause the liquids placed in the container 6 to mix, suitable depending rods or paddles 21 are connected to the bottom of the receptacle 3 and so that when the receptacle 3 is rotated, the paddles 21 will produce a high rate of rotation in the liquids. The paddles 21 may be connected together by means of the radiating rods 22 and the ring 23. This will maintain the rods in their relative positions and reduce the strain on their connections with the receptacle 3.

In order to rotate the head 1, the receptacle 3, and the paddles 21, the head 1 is connected to a spindle 25 that extends up through a sleeve 26 formed integrally with the container 6. The sleeve 26 extends from the bottom of the container 6 and preferably to the head 1. The head 1 is provided with a protruding central hub 27 that has a square socket for receiving the square end portion 28 of the spindle 25 to key the head 1, and consequently to connect the head, the receptacle 3, and the paddles 21 to the spindle 25. The spindle 25 is rotatably supported in a bearing 30 located in the shell 7. The spindle 25 may be supported as against the end thrust to which it will be subjected by means of the ball bearings 31 into which the lower end of the spindle 25 is stepped. When the spindle 25 is placed in position, it is connected to an electric motor 32 located in the shell 7, and which is connected to a suitable source of electric current and to a controlling switch by means of the wires 33.

I have thus provided a simple and efficient means for mixing liquids and extracting fruit juices, and which is so constructed that the parts may be easily separated and cleaned.

I claim:—

1. In a fruit juice extractor and mixer, a ribbed head, a perforated receptacle connected to the head having a diameter greater than its mouth, a container for containing the head and receptacle, paddles connected to the receptacle for causing rotation of liquids located in the container, and means for causing rotation of the head, receptacle and the paddles.

2. In a fruit juice extractor and mixer, a ribbed head, a perforated receptacle connected to the head having a diameter greater than its mouth, a container for containing the head and receptacle, paddles connected to the receptacle for causing rotation of liquids located in the container, and means for causing rotation of the head, receptacle and the paddles, the container having a mouth and a lip for closing the mouth whereby liquids may be directed into the container.

In testimony whereof I have hereunto signed my name to this specification.

ANDREW ZOUVELOS.